United States Patent
Halcom

(10) Patent No.: US 12,129,887 B2
(45) Date of Patent: Oct. 29, 2024

(54) SELF-RETAINING WEAR-PAD LEVELER

(71) Applicant: Bell Textron Inc., Fort Worth, TX (US)

(72) Inventor: Lancer Drake Halcom, Coppell, TX (US)

(73) Assignee: Textron Innovations Inc., Providence, RI (US)

( * ) Notice: Subject to any disclaimer, the term of this patent is extended or adjusted under 35 U.S.C. 154(b) by 148 days.

(21) Appl. No.: 17/509,047

(22) Filed: Oct. 24, 2021

(65) Prior Publication Data

US 2023/0129055 A1 Apr. 27, 2023

(51) Int. Cl.
*F16C 11/04* (2006.01)
*B64C 11/28* (2006.01)
*B64C 29/00* (2006.01)

(52) U.S. Cl.
CPC ............ *F16C 11/045* (2013.01); *B64C 11/28* (2013.01); *B64C 29/0033* (2013.01); *Y10T 403/32852* (2015.01); *Y10T 403/32926* (2015.01)

(58) Field of Classification Search
CPC ........... F16C 11/045; Y10T 403/32819; Y10T 403/32852; Y10T 403/32861; Y10T 403/32918; Y10T 403/32926
See application file for complete search history.

(56) References Cited

U.S. PATENT DOCUMENTS

| | | | |
|---|---|---|---|
| 4,072,431 A | 2/1978 | Waight et al. | |
| 6,371,681 B1 * | 4/2002 | Covington | F16C 11/0614 244/17.11 |
| 6,669,393 B2 * | 12/2003 | Schilling | F02C 7/32 244/54 |
| 8,002,489 B2 * | 8/2011 | Mahy | F16C 27/063 267/141.2 |
| 8,197,153 B2 * | 6/2012 | Halcom | F16C 11/0614 403/114 |
| 8,888,396 B2 | 11/2014 | Halcom et al. | |
| 9,150,302 B2 * | 10/2015 | Wildman | B64C 9/323 |
| 9,272,781 B2 | 3/2016 | Day et al. | |
| 9,278,752 B2 * | 3/2016 | Osvog | F16C 27/02 |
| 9,863,468 B2 | 1/2018 | Halcom | |
| 10,634,092 B2 | 4/2020 | Simpson et al. | |
| 10,752,348 B2 | 8/2020 | Laitenberger et al. | |

FOREIGN PATENT DOCUMENTS

WO   WO 2014/179016   * 11/2014   ............. F16C 11/04

* cited by examiner

*Primary Examiner* — Michael P Ferguson
(74) *Attorney, Agent, or Firm* — Lightfoot & Alford PLLC

(57) ABSTRACT

A self-retaining wear-pad leveler has a first plate having arms on opposing sides and forming an aperture through the first plate. A rear section is coupled to a rear portion of the first plate and has tabs extending from opposing sides of the rear section. The arms are configured for being retained about a ball of a spherical bearing assembly, and the tabs are configured to cause rotation of the leveler about the bearing when engaged by a component coupled to and rotating about the bearing.

16 Claims, 9 Drawing Sheets

SELF-RETAINING WEAR-PAD LEVELER

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Universal joints provide a significant amount of design flexibility when it comes to managing the misalignment expected across a system of parts moving with respect to each other while also remaining connected. However, these same joints typically have multiple wear elements, are oftentimes cumbersome to assemble, and can be extremely bulky and heavy, especially when used within a centrifugal force (CF) field (e.g., helicopter rotor heads). Universal joints and the like can also introduce limitations into assemblies that may be detrimental to overall performance and packaging constraints (e.g., drag impacts, proximity to other critical components, etc.).

Like a universal joint, spherical bearings allow for unrestrained misalignment in more than one direction, which can be problematic for maintaining control of a component or by allowing for clashes or interference of components.

DETAILED DESCRIPTION

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

A self-retaining wear-pad leveler is a gap filling, double sided wear pad that also serves as a leveling device to properly orient an interstitial link that is free to rotate about its line of action.

The leveler is preferably formed of a flexible, lubricious material that can be deformed during installation, allowing the leveler to properly seat around and within the adjacent components. The shape, features and contouring of the leveler are specifically designed to effectively allow for motion between the interfacing components in more than just one direction but preferably no more than two directions. Various features (ramped driver tabs, pivot matching humps, groove filling ridges and spacer pads) all serve to retain the leveler and to properly orient one or more components while allowing for relative motion.

Figure 1:
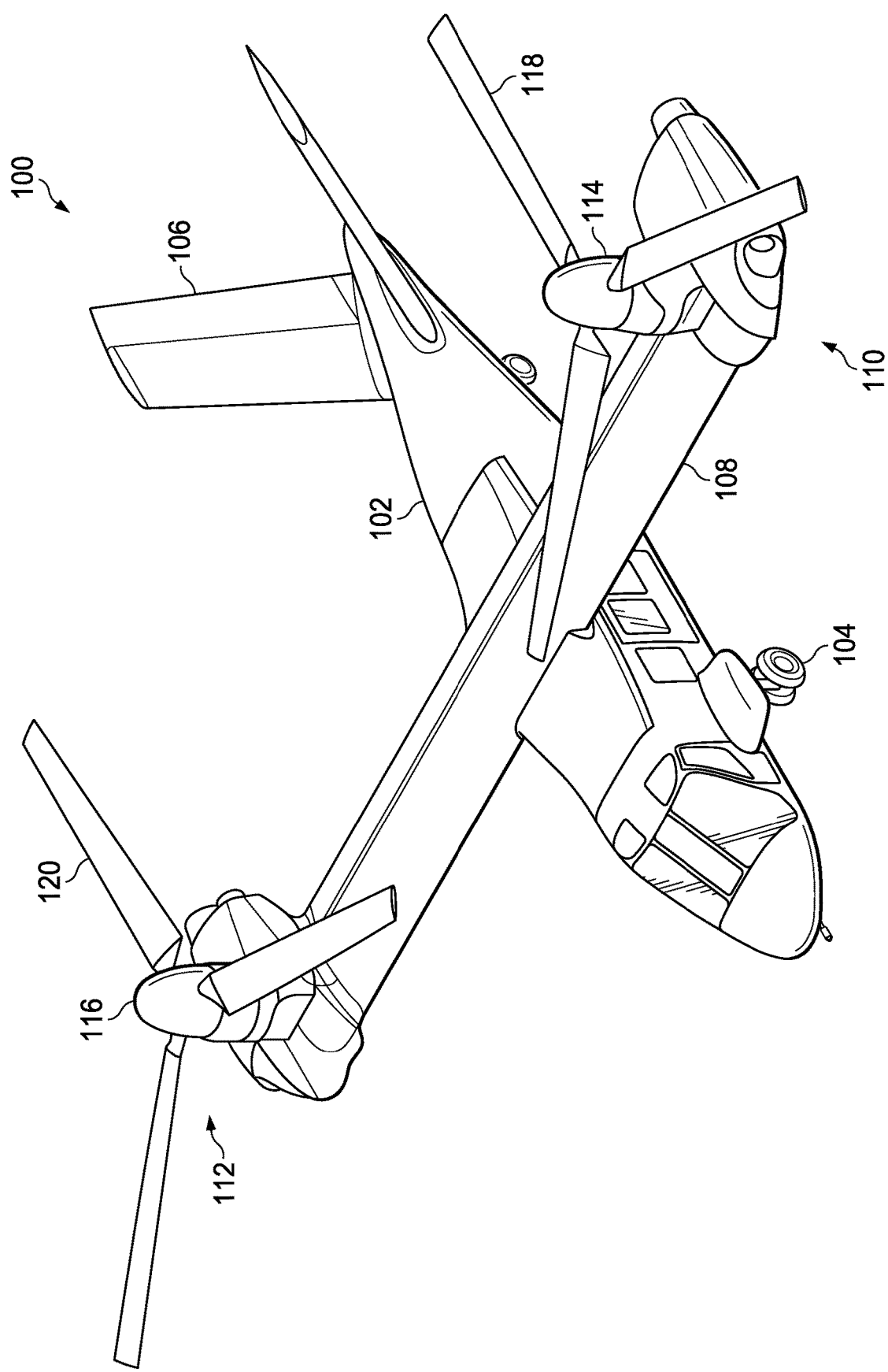
FIG. 1 is an oblique view of a tiltrotor aircraft configured in a helicopter mode and comprising an embodiment of a leveler according to this disclosure.
Figure 2:
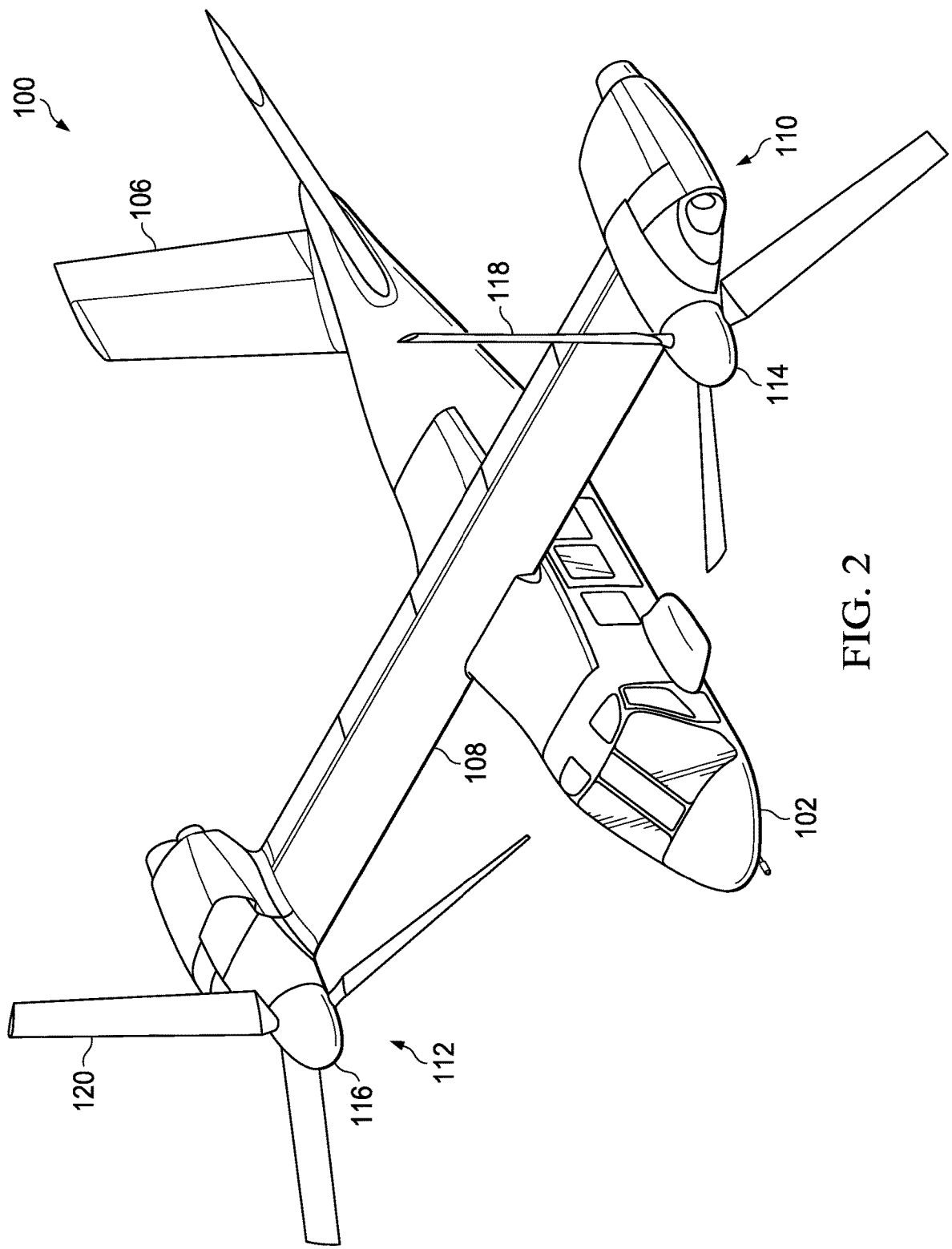
FIG. 2 is an oblique view of the aircraft of FIG. 1 configured in an airplane mode.

FIGS. 1 and 2 illustrate a tiltrotor aircraft 100, which can include a fuselage 102, landing gear 104, tail member 106, wing 108, propulsion system 110, and propulsion system 112. Each propulsion system 110, 112 includes a fixed engine and rotatable proprotor 114, 116, respectively. Each rotatable proprotor 114, 116 has a plurality of foldable rotor blades 118 and 120, respectively. The position of proprotors 114, 116, as well as the pitch of blades 118, 120, can be selectively controlled in order to selectively control direction, thrust, and lift of tiltrotor aircraft 100. FIG. 1 shows aircraft 100 in a helicopter mode, and FIG. 2 shows aircraft 100 in an airplane mode.

Figure 3:
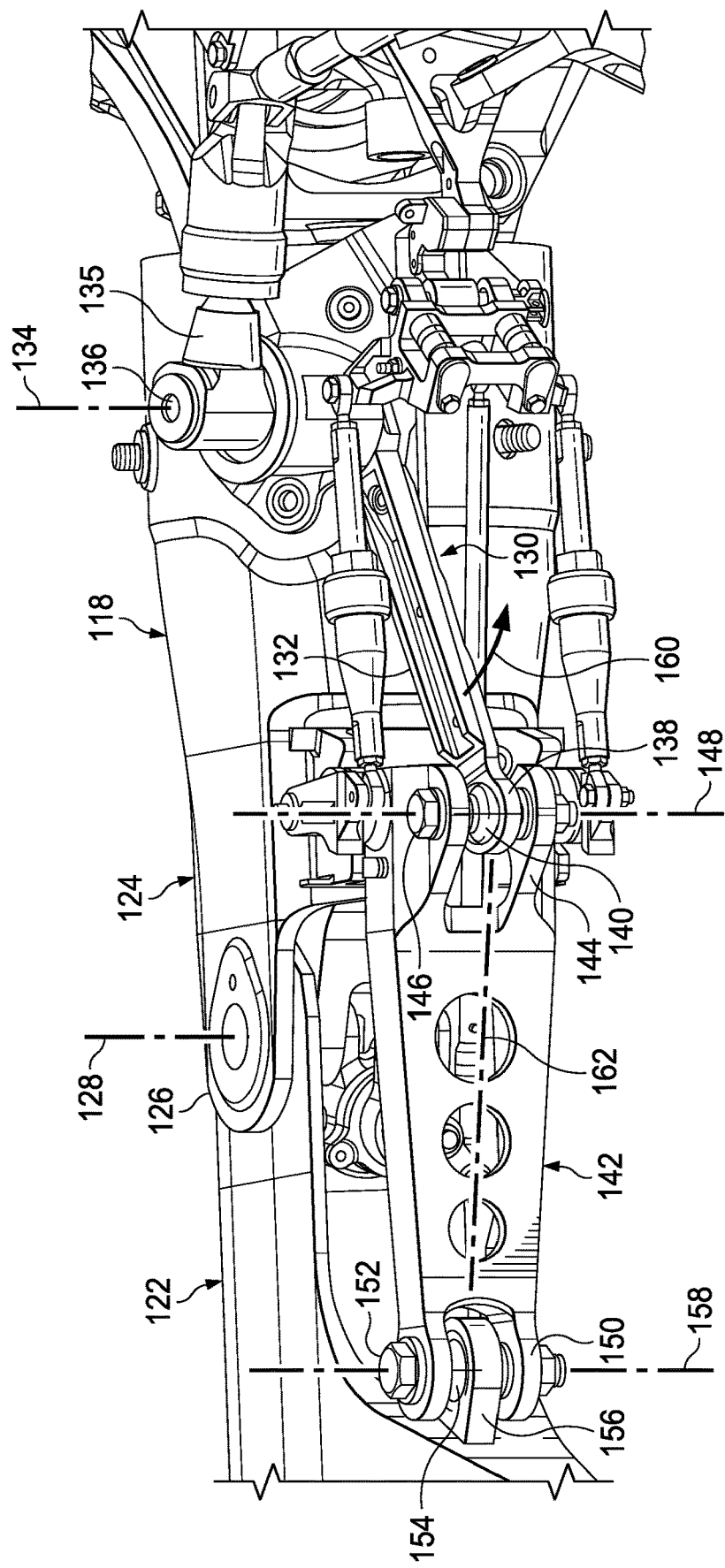
FIG. 3 is an oblique view of a portion of a rotor of the aircraft of FIG. 1 and showing a folding mechanism configured in an extended position.
Figure 4:
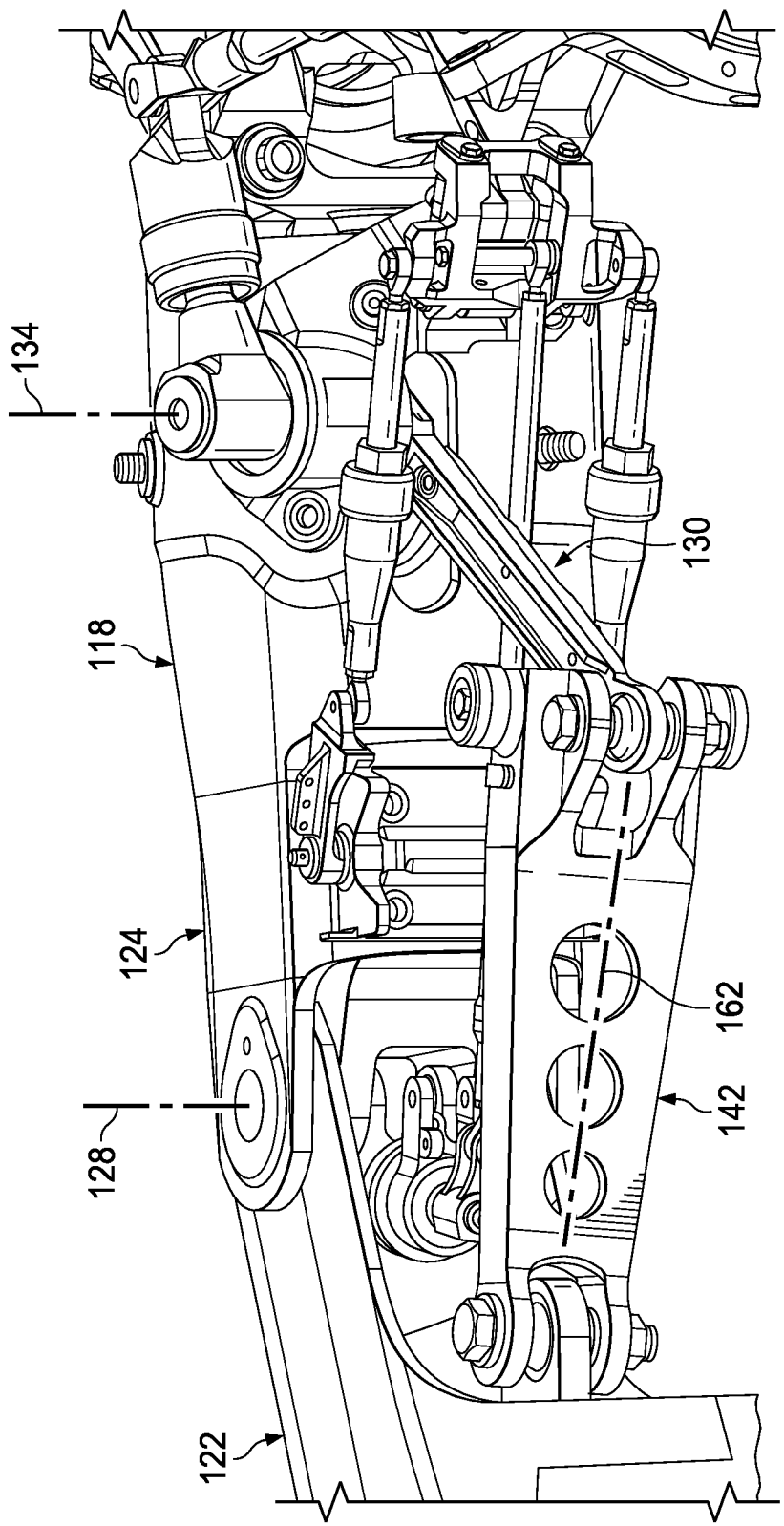
FIG. 4 is an oblique view of the portion of the rotor of FIG. 3 and configured in a partially folded position.
Figure 5:
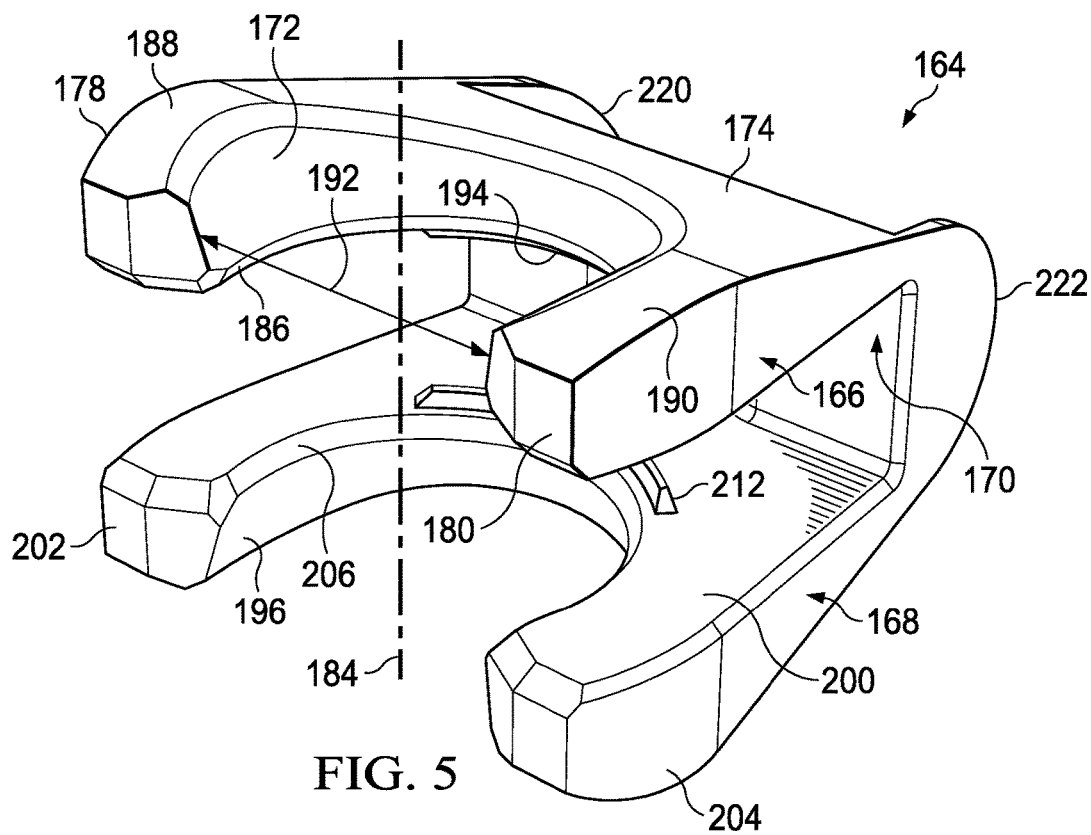
FIG. 5 is an oblique front view of a leveler according to this disclosure.
Figure 6:
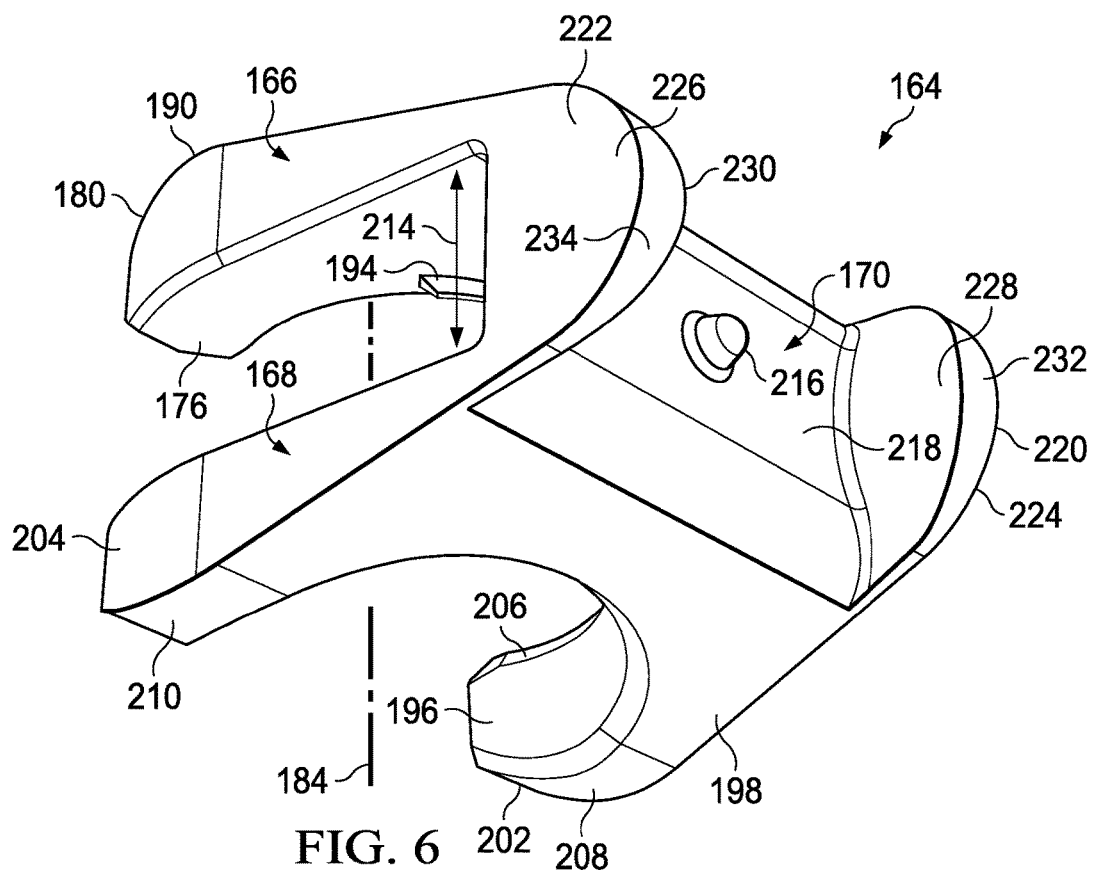
FIG. 6 is an oblique rear view of the leveler of FIG. 5.

Referring to FIGS. 3 and 4, to allow for at least some of blades 118, 120 to fold, an outboard blade portion 122 is coupled to an inboard portion 124 at hinge 126, allowing outboard portion 122 to pivot relative to inboard portion 124 via hinge 126 and about pivot axis 128.

A crank arm assembly 130 comprises a crank arm 132 selectively pivotable about a crank axis 134 by rotation of a trunnion 135, trunnion 135 being coupled to an inner end of crank arm 132 with shaft 136. Crank arm 132 has a bearing pocket 138 located at an outer end of arm 132 opposite shaft 136, pocket 138 being configured for receiving a spherical bearing 140. An interstitial link 142 couples crank arm 132 to outboard portion 122 of blade 118, allowing rotation of trunnion 135 about axis 134 to cause rotation of outboard portion 122 about pivot axis 128.

Interstitial link 142 has a crank clevis 144 at an inboard end and configured to be fastened to bearing 140 with fastener 146, allowing for crank arm 132 and link 142 to pivot relative to each other about pivot axis 148. A blade clevis 150 is located on the outboard end of link 142 and configured to be fastened with fastener 152 to spherical bearing 154, which is carried in pillow block 156 of outboard blade portion 122. Spherical bearing 154 and pillow block 156 together comprise a spherical bearing assembly. This allows for link 142 and outboard portion 122 to pivot relative to each other about pivot axis 158.

To move outboard blade portion 122 between the fully extended position shown in FIG. 3 and a folded position, trunnion 135 and crank arm 132 are rotated together about crank axis 134. From the fully extended position, crank arm 132 is rotated in the direction shown by arrow 160, and FIG. 4 shows components moved to a partially folded configuration. As crank arm 132 is rotated, interstitial link 142 transfers force from spherical bearing 140 in pocket 138 of crank arm 132 to outboard portion 122 through spherical bearing 154 in pocket 156. Moving outboard portion 122 toward the fully extended position is accomplished by rotating trunnion 135 and crank arm 132 together in the opposite direction.

Spherical bearings 140 and 154 each constrain the associated end of interstitial link 142 for rotation relative to adjacent components about axes 148 and 158, respectively. However, bearings 140 and 154 cooperate to form link axis 162, about which link 142 can rotate. This rotation about axis 162 typically occurs during relative motion of link 142 with adjacent components, but rotation may also occur while link 142 is in a static position, such as when link 142 is subjected to forces during operation of proprotors 114, 116.

To minimize the amount of rotation of link 142 about axis 162, a self-retaining wear-pad leveler 164, as shown in FIGS. 4 through 10, is installed at spherical bearing 154. In the embodiment shown in detail in FIGS. 5 and 6, leveler 164 is a unitary component and is preferably formed from a flexible and lubricious material that allows for deformation during installation. Though shown as unitary, other embodiments of levelers according to this disclosure may comprise more than one piece assembled together prior to or during installation.

In the embodiment shown, leveler 164 comprises an upper plate 166, a lower plate 168, and a rear section 170. Upper plate 166 and lower plate 168 are configured to be identical, though plates 166, 168 may be configured differently in other embodiments. Rear section 170 connects the rear portions of plates 166, 168 and acts as an elastic "living" hinge. This allows plates 166, 168 to rotate relative to each other through deformation of rear section 170 during installation.

In this embodiment, upper plate 166 and lower plate 168 are configured as identical, and plate 166 will be described in detail. The description of upper plate 166 will equally apply to mirrored features on lower plate 168.

Upper plate 166 has varying thickness, with a thinner cross-section at the rear and a thicker cross-section toward the front. Aperture 172, which is preferably conical or spherical, extends through the thickness of plate 166 between tapered and/or curved outer surface 174 and planar inner surface 176, thereby forming opposing arms 178, 180. Aperture 172 is centered on axis 184, with the wider diameter of aperture 172 at outer surface 174. Surface 186, which is preferably conical or spherical, is formed at the intersection of inner surface 176 and aperture 172 and is sized for receiving a ball portion of spherical bearing 154. The maximum thickness of plate 166 is located on each arm 178, 180 at pivots 188, 190, respectively, pivots 188, 190 being generally aligned with axis 184. This configuration gives arms 178, 180 a wedge-shaped longitudinal cross-section. In preferred embodiments, a gap 192 between the forward ends of arms 178, 180 is smaller than the smaller diameter of surface 186. A curved guide 194 protrudes from inner surface 176 and is coaxial with axis 184. Guide 194 is configured for engaging a stake groove or other feature of bearing 154 or pillow block 156.

Lower plate 168 has aperture 196, which is preferably a conical or spherical, extending between tapered and/or curved outer surface 198 and planar inner surface 200, thereby forming opposing arms 202, 204. Aperture 196 is also centered on axis 184, with the wider diameter of aperture 196 at outer surface 198. Surface 206, which is preferably conical or spherical, is formed at the intersection of inner surface 200 and aperture 196 and is sized for receiving a ball portion of spherical bearing 154. The maximum thickness of plate 168 is located on each arm 202, 204 at pivots 208, 210, respectively, pivots 208, 210 being generally aligned with axis 184. Guide 212 protrudes from inner surface 200 and is coaxial with axis 184.

Rear section 170 is a generally planar component that connects the rear portions of plates 166, 168, positioning inner surfaces 176, 200 as parallel and spacing surfaces 176, 200 from each other by the amount shown as gap 214. Gap 214 is slightly oversized for receiving pillow block 156. An optional spacer 216 protrudes from a central portion of rear surface 218, whereas tabs 220, 222 each protrude rearwardly from opposing sides of rear surface 218. Each tab 220, 222 has a generally planar outer surface 224, 226 and a curved or tapered inner surface 228, 230, respectively, with the maximum thickness of tabs 220, 222 being in the middle of tabs 220, 222. Each tab 220, 222 has a curved rear surface 232, 234, respectively.

Figure 7:
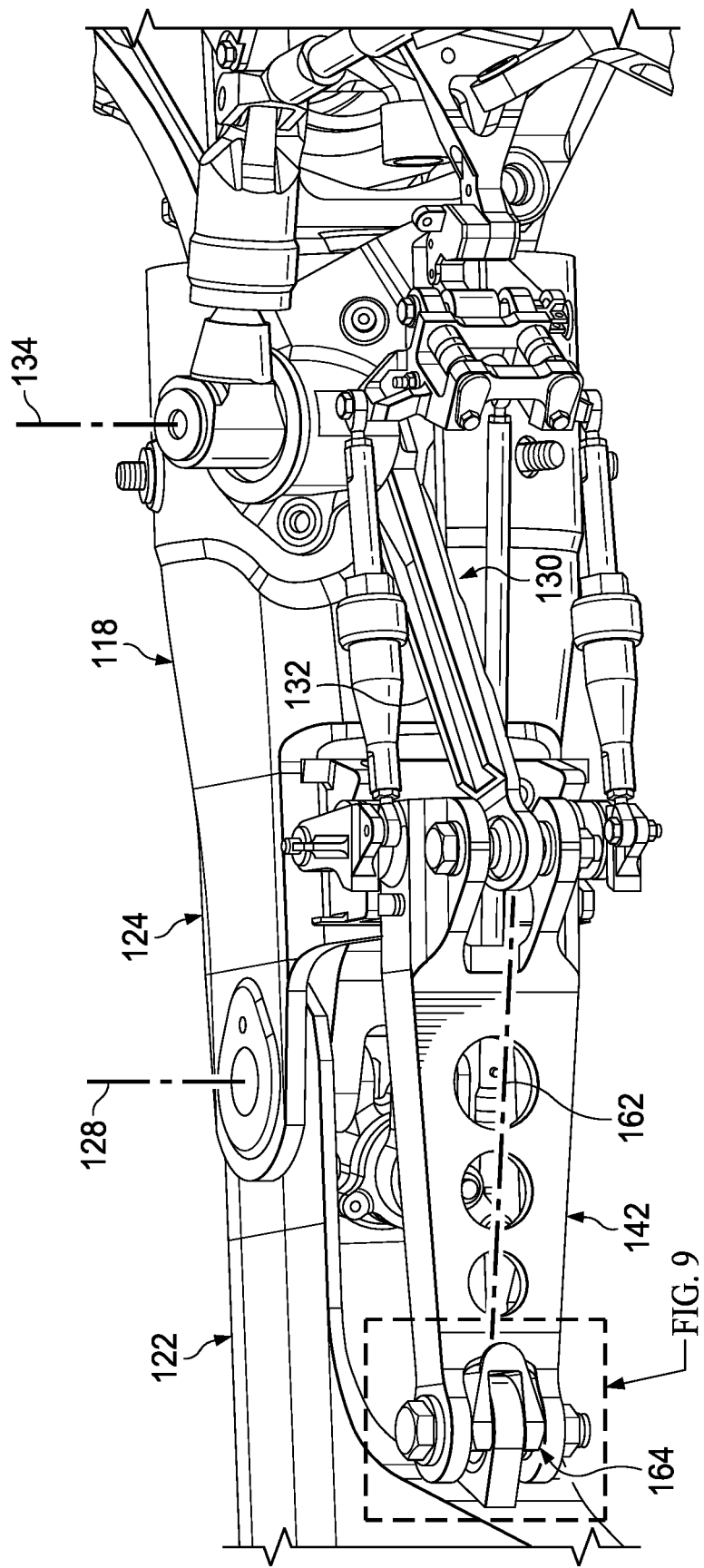
FIG. 7 is an oblique view of the portion of the rotor configured as in FIG. 3 with the leveler of FIG. 5 installed.
Figure 8:
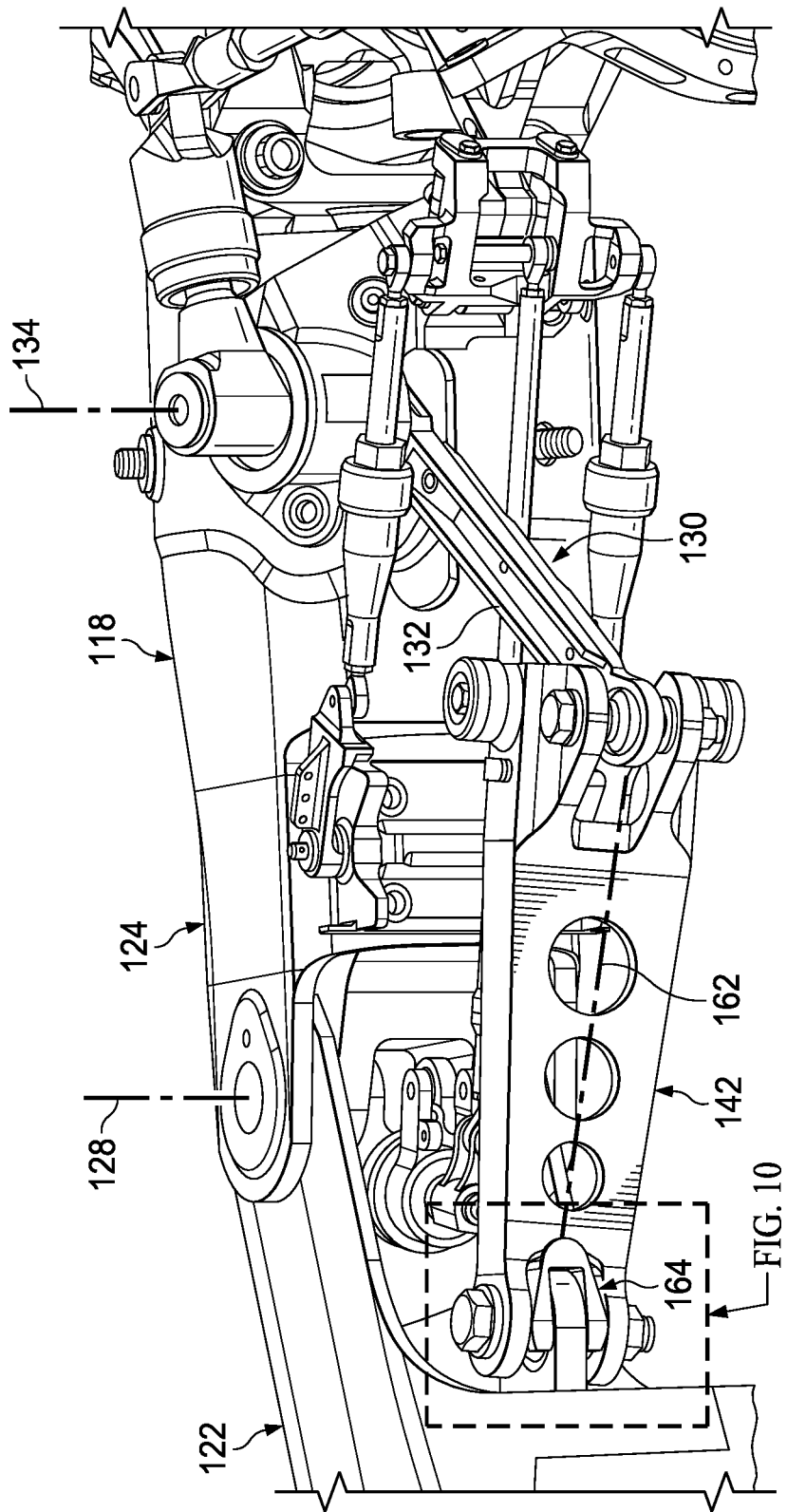
FIG. 8 is an oblique view of the portion of the rotor configured as in FIG. 4 with the leveler of FIG. 5 installed.
Figure 10:
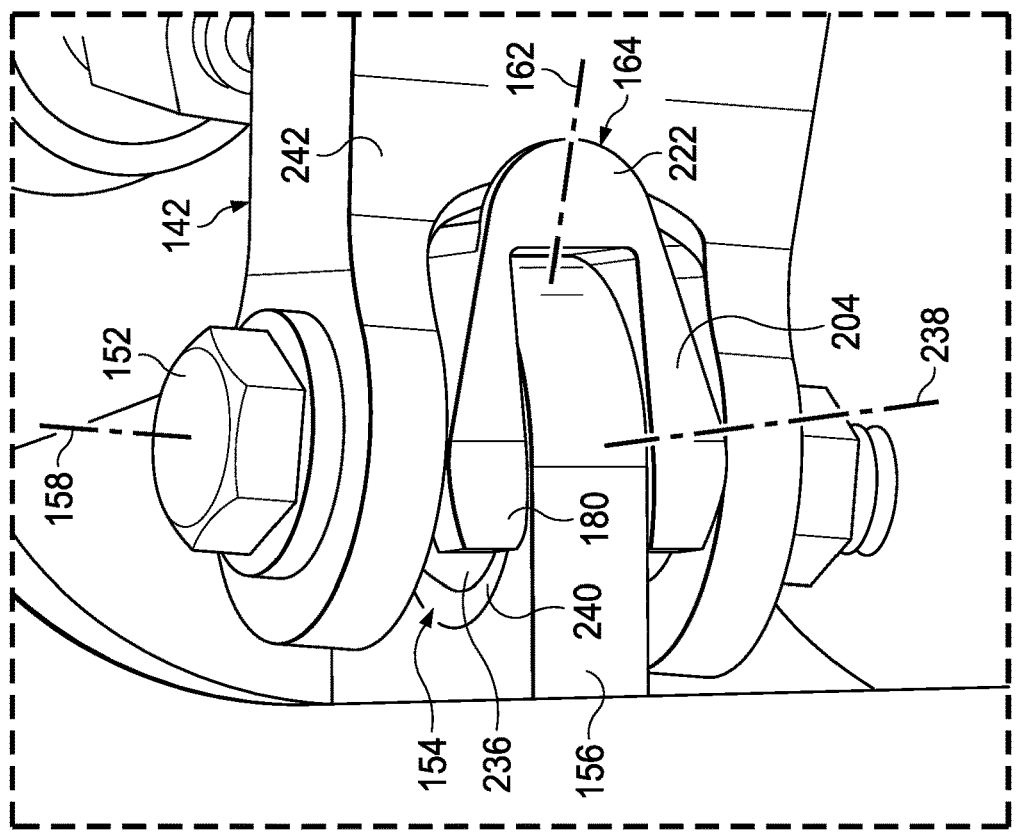
FIG. 10 is an enlarged oblique view of a portion of the rotor as shown in FIG. 8.
Figure 9:
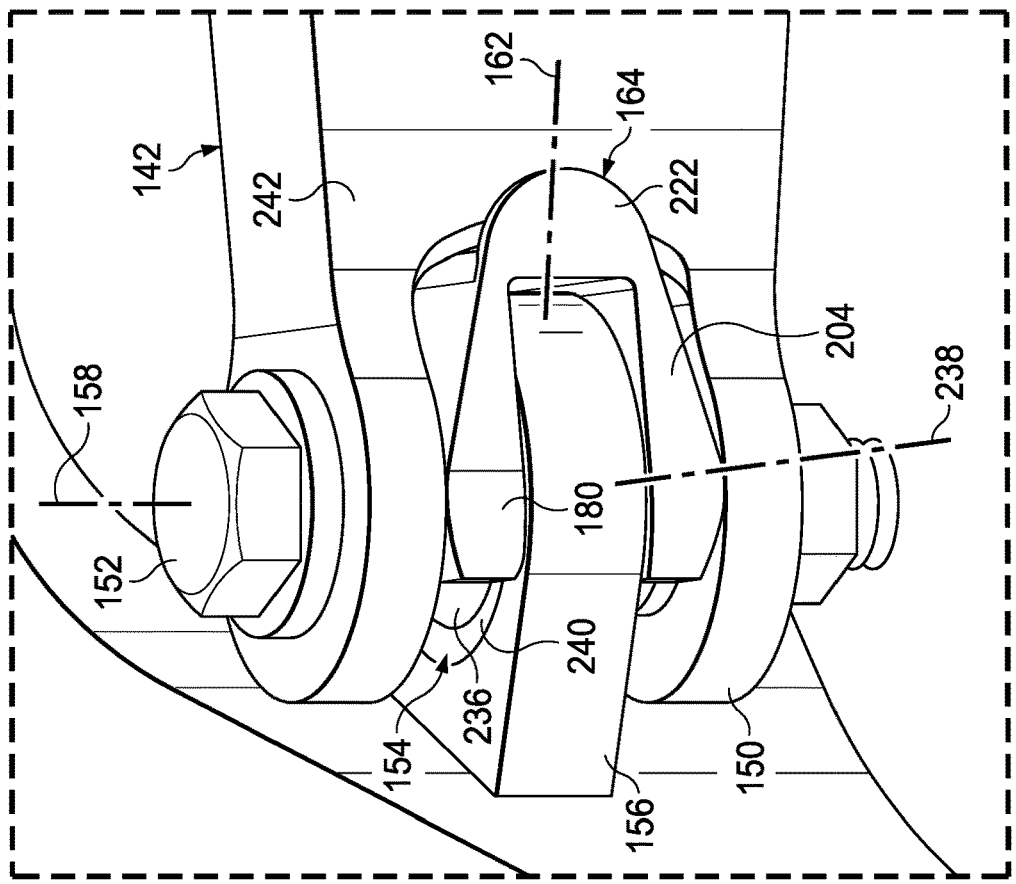
FIG. 9 is an enlarged oblique view of a portion of the rotor as shown in FIG. 7.

FIGS. 7 and 8 and enlarged detail FIGS. 9 and 10 illustrate leveler 164 installed on the blade fold mechanism and in the same configurations as shown in FIGS. 3 and 4, respectively.

The features and contouring of leveler 164 are specifically designed to retain leveler 164 in the assembly and allow for relative motion between interstitial link 142 and pillow block 156 while maintaining proper orientation of link 142. As off-axis crank arm 132 begins to act on interstitial link 142, leveler 164 guides the motion of link 142 in the same way that a universal joint would, allowing link 142 to pivot in only two directions with respect to the folding outboard blade portion 122.

Leveler 164 can be configured to allow installation before, during, or after assembly of blade clevis 150 to bearing 154. In a preferred embodiment, leveler is configured for one or more of arms 178, 180, 202, 204, tabs 220, 222, and rear section 170 to be deformed and allow for leveler to be inserted into the spaces between clevis 150, bearing 154, and pillow block 156 after these components are assembled. Specifically, arms 178, 180, 202, 204 snap around ball 236 of bearing 154, with surfaces 186, 206 possibly contacting ball 236. This positions arms 178, 180, 202, 204 to at least partially fill the gaps between clevis 150 and pillow block 156, thereby allowing for leveler 164 to prevent excessive rotation of link 142 about axis 162. This positioning also centers pivots 188, 190 of upper plate 166 and pivots 208, 210 of lower plate 168 (only pivots 190 and 210 visible) about ball 236, allowing clevis 150 to pivot a limited amount relative to leveler 164 about axis 238.

Leveler 164 is also allowed to pivot a limited amount together with link 142 about axis 158. In addition to surfaces 186, 206 being centered on ball 236, curved guides 194, 212 engage stake grooves 240 or a similar complementary concentric feature of bearing 154 or pillow block 156, and one or both of surfaces 186, 206 and guides 194, 212 act to define a center of rotation for leveler 164 about axis 158. In alternative embodiments, guides 194, 212 may be configured as grooves that engage a complementary protruding feature of pillow block 156, and guides 194, 212 may alternatively be posts or similarly narrow features configured to engage stake grooves 240. Each tab 220, 222 (only 222 is visible) is positioned on one side of link 142 outside of clevis 150, such that inner surfaces 228, 230, respectively, engage outer surfaces of link 142. For example, inner surface 230 of tab 222 engages outer surface 242 of link 142, allowing for rotation of link 142 about axis 158 to cause corresponding rotation of leveler 164.

Figure 11:
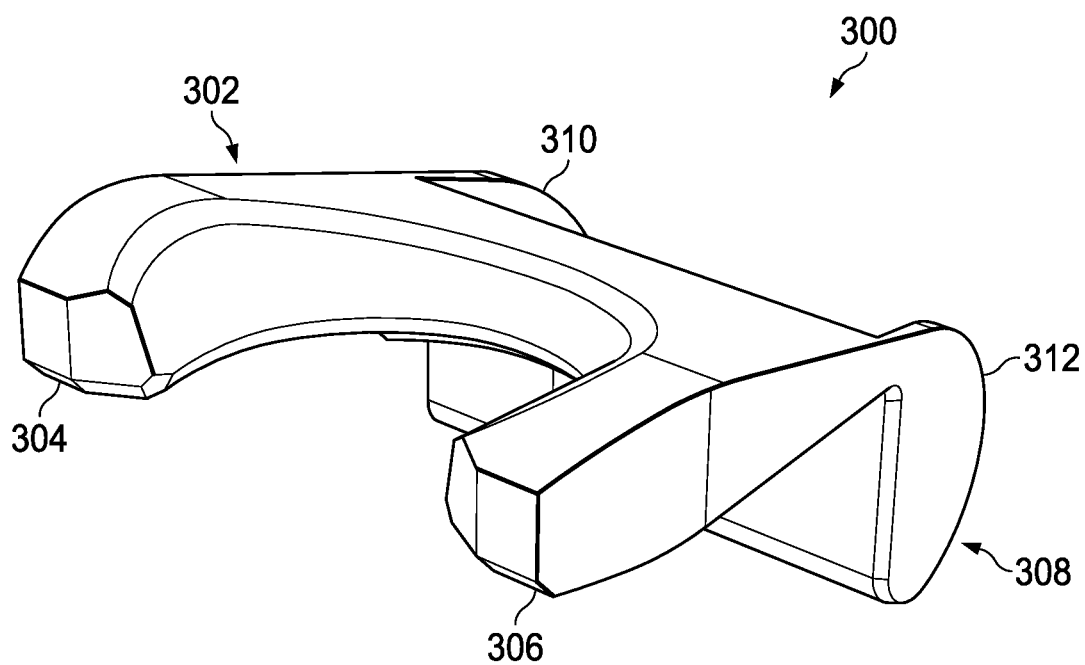
FIG. 11 is an oblique front view of an alternative embodiment of a leveler according to this disclosure

FIG. 11 shows another embodiment of a leveler according to this disclosure. Leveler 300 is constructed similarly to leveler 164, as described above, but leveler 300 includes only one plate 302, with arms 304, 306, and rear portion 308, with tabs 310, 312. Leveler 300 is installed in the manner described above and may be used in place of leveler 164. Leveler 300 may be optionally installed with plate 302 oriented on either side of a spherical bearing, or the orientation may be dictated by the application.

Levelers according to this disclosure have several design elements that provide an effective solution for controlling undesirable rotation of components. The symmetrical shape and flexibility of the levelers assist with gap filling, self-retention, and wear characteristics. These levelers may be configured to provide for protection against dust or foreign-object ingress and may be configured to wipe or brush bearing components during operation. The contours of surfaces are designed to limit interface with adjacent components to minimize accelerated wear and to reduce the chances for binding, and these levelers may be used with shims to tailor the fit on specific applications. While shown as being formed solely from an elastic material, parts of the levelers may be formed from rigid materials (such as wear surfaces), or levelers may incorporate an internal structure. As described above, levelers may be formed in multiple parts, including levelers that are split horizontally between the plates or vertically between the arms. These embodiments may allow for better manufacturability and/or additional options for installation procedures, such as assembly before or during installation.

At least one embodiment is disclosed, and variations, combinations, and/or modifications of the embodiment(s) and/or features of the embodiment(s) made by a person having ordinary skill in the art are within the scope of this disclosure. Alternative embodiments that result from combining, integrating, and/or omitting features of the embodiment(s) are also within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed.

Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. A self-retaining wear-pad leveler, comprising:
   a first upper plate having a pair of opposing horizontally-extending arms on opposing sides thereof and forming an aperture therebetween through the first plate, each arm having an upper outer surface defining a convex pivot at a distal end thereof spaced from an opposing lower inner surface of the associated arm; and
   a rear section coupled to and downwardly extending from a rear portion of the first plate and having a pair of horizontally-spaced tabs extending from opposing sides of the rear section in a direction away from the convex pivots, the convex pivots being spaced from the rear section;
   wherein the arms are configured for cooperating to receive a portion of a ball of a spherical bearing assembly within the aperture between the arms for retaining the leveler adjacent the ball;
   wherein the tabs are configured to cause rotation of the leveler about a fastener axis coaxial with a fastener vertically extending through the ball of the spherical bearing assembly when the tabs are engaged by a component coupled to and rotating about the fastener axis; and
   wherein the leveler is formed from an elastic material, the convex pivots being configured to allow rotation of the component relative to the leveler about a lateral pivot axis intersecting and generally perpendicular to the fastener axis and flexing of the elastic material providing for limited rotation of the component about pivot axes that intersect both the fastener axis and lateral pivot axis and extend away from the lateral pivot axis.

2. The leveler of claim 1, further comprising:
   a guide located on the inner surface of the first plate and configured for engaging a complementary feature of the bearing assembly.

3. The leveler of claim 1, further comprising:
   a protrusion located on the inner surface of the first plate and configured for engaging a groove of the bearing assembly.

4. The leveler of claim 1, wherein the convex pivots are aligned with each other.

5. The leveler of claim 1, wherein the convex pivots are at a location of maximum thickness of the first plate.

6. The leveler of claim 1, wherein the aperture is conical.

7. The leveler of claim 1, wherein the aperture is spherical.

8. The leveler of claim 1, further comprising:
   an opposing second lower plate coupled to the rear section and vertically-spaced from the first plate, the second plate having a pair of opposing horizontally-extending arms on opposing sides thereof and forming an aperture therebetween through the second plate;
   wherein the arms are configured for receiving a portion of the ball of the spherical bearing assembly.

9. The leveler of claim 1, wherein multiple parts are assembled together to form the leveler.

10. A self-retaining wear-pad leveler, comprising:
    a body comprising opposing upper and lower plates coupled to each other by a rear section vertically extending between rear portions of the upper and lower plates;
    a pair of opposing horizontally-extending arms extending from each upper and lower plate, the arms of each plate being on opposing sides of an aperture defined therebetween, the apertures of the plates being coaxial; each arm having a respective upper or lower outer surface defining a convex pivot at a distal end thereof spaced from an opposing respective lower or upper inner surface of the associated arm and from the rear section; and a pair of horizontally-spaced tabs extending from the rear section in a direction away from the convex pivots;

wherein the arms of each plate are configured for cooperating to receive a portion of a ball of a spherical bearing assembly within the aperture between the arms of each plate and between the plates for retaining the leveler adjacent the ball;

wherein the tabs are configured to cause rotation of the body about a fastener axis coaxial with a fastener vertically extending through the ball of the spherical bearing assembly when the tabs are engaged by a component coupled to the bearing assembly and rotating about the fastener axis; and wherein the leveler is formed from an elastic material, the convex pivots being configured to allow rotation of the component relative to the body about a lateral pivot axis intersecting and generally perpendicular to the fastener axis and flexing of the elastic material providing for limited rotation of the component about pivot axes that intersect both the fastener axis and lateral pivot axis and extend away from the lateral pivot axis.

11. The leveler of claim 10, further comprising:
a guide located on the inner surface of at least one of the upper and lower plates and configured for engaging a complementary feature of the bearing assembly.

12. The leveler of claim 10, wherein the convex pivots are aligned with each other.

13. The leveler of claim 10, wherein multiple parts are assembled together to form the leveler.

14. A wear-pad leveler for a bearing assembly, the assembly having a spherical bearing assembly carried in a pillow block, the leveler comprising:

a first upper plate having a pair of opposing horizontally-extending arms on opposing sides thereof and forming an aperture therebetween through the first plate, an upper outer surface of each arm having a convex pivot at a distal end thereof, the first plate having an opposing lower inner surface configured for placement adjacent the pillow block, each convex pivot being spaced from the inner surface of the associated arm; and a rear section coupled to and downwardly extending from a rear portion of the first plate and having a pair of horizontally-spaced tabs extending from opposing sides of the rear section in a direction away from the convex pivots;

wherein the arms are configured for being retained about a ball of the spherical bearing assembly within the aperture;

wherein the tabs are configured to cause rotation of the leveler about a fastener axis coaxial with a fastener vertically extending through the ball of the spherical bearing assembly when engaged by a component coupled to and rotating about the bearing assembly; and wherein the leveler is formed from an elastic material, the convex pivots being configured to allow rotation of the component relative to the leveler about a lateral pivot axis intersecting and generally perpendicular to the fastener axis and flexing of the elastic material providing for limited rotation of the component relative to the pillowblock about pivot axes that intersect both the fastener axis and lateral pivot axis and extend away from the lateral pivot axis.

15. The leveler of claim 14, further comprising:
an opposing second lower plate coupled to the rear section and vertically-spaced from the first plate, the second plate having a pair of opposing horizontally-extending arms on opposing sides thereof and forming an aperture therebetween through the second plate, a convex lower outer surface of each arm of the second plate having a convex pivot at a distal end thereof, the second plate being spaced a distance from the first plate allowing for the pillow block to be located between the plates, an upper inner surface of the second plate being configured for placement adjacent the pillow block, each convex pivot being spaced from the inner surface of the associated arm.

16. The leveler of claim 14, wherein multiple parts are assembled together to form the leveler.

* * * * *